(12) United States Patent
Lee et al.

(10) Patent No.: US 10,461,566 B2
(45) Date of Patent: Oct. 29, 2019

(54) SYSTEM, APPARATUS, AND METHOD FOR CAPACITIVE WIRELESS CHARGING

(71) Applicant: Toyota Motor Engineering & Manufacturing North America, Inc., Erlanger, KY (US)

(72) Inventors: Jae Seung Lee, Ann Arbor, MI (US); Jongwon Shin, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 77 days.

(21) Appl. No.: 15/726,706

(22) Filed: Oct. 6, 2017

(65) Prior Publication Data

US 2019/0109481 A1    Apr. 11, 2019

(51) Int. Cl.
| | |
|---|---|
| *H02J 7/02* | (2016.01) |
| *H02J 50/05* | (2016.01) |
| *H02J 50/90* | (2016.01) |
| *H02M 3/335* | (2006.01) |
| *H02M 7/5387* | (2007.01) |
| *B60L 53/20* | (2019.01) |
| *H02J 3/32* | (2006.01) |

(52) U.S. Cl.
CPC .............. *H02J 7/025* (2013.01); *H02J 50/05* (2016.02); *H02J 50/90* (2016.02); *H02M 3/33584* (2013.01); *B60L 53/20* (2019.02); *H02J 3/32* (2013.01); *H02M 7/5387* (2013.01)

(58) Field of Classification Search
CPC ............ H02J 7/025; H02J 50/90; H02J 50/05; H02M 7/5387; B60L 53/20
USPC .......................................................... 320/107
See application file for complete search history.

(56) References Cited

U.S. PATENT DOCUMENTS

| | | | |
|---|---|---|---|
| 6,216,445 B1 * | 4/2001 | Byers | F03H 1/0012 60/202 |
| 6,580,909 B1 * | 6/2003 | Carro | H04W 60/00 455/435.1 |
| 6,876,209 B2 * | 4/2005 | Lin | G01D 5/2405 324/207.14 |
| 8,933,663 B2 | 1/2015 | Elias et al. | |
| 9,030,053 B2 * | 5/2015 | Lee | H02J 17/00 307/104 |
| 9,126,490 B2 | 9/2015 | Cook et al. | |
| 9,147,523 B2 * | 9/2015 | Hente | H01F 38/14 |
| 9,577,449 B2 * | 2/2017 | Hoover | H02J 7/025 |

(Continued)

FOREIGN PATENT DOCUMENTS

| | | |
|---|---|---|
| EP | 3151359 | 4/2017 |
| KR | 101526589 | 6/2015 |

*Primary Examiner* — M Baye Diao
(74) *Attorney, Agent, or Firm* — Oblon, McClelland, Maier & Neustadt, L.L.P.

(57) ABSTRACT

A capacitive wireless charging system having a charging circuit and the operating characteristics of the charging circuit can be adjusted. The charging circuit includes two coupling capacitors formed by two electrode plates at least partially overlapping two other electrode plates, where the coupling characteristics of the coupling capacitors can be adjusted by moving at least one of the electrodes. When the coupling characteristics of the coupling capacitors reach a pre-determined threshold, the operating characteristics of the charging circuit can be adjusted to optimize the power transfer efficiency of the capacitive wireless charging system.

20 Claims, 5 Drawing Sheets

(56) References Cited

U.S. PATENT DOCUMENTS

| | | | |
|---|---|---|---|
| 9,649,948 B2 | 5/2017 | Bell et al. | |
| 10,084,338 B2* | 9/2018 | Yang | H02J 7/045 |
| 10,312,750 B2* | 6/2019 | Boer | H02J 7/025 |
| 2009/0146608 A1* | 6/2009 | Lee | H02J 7/025 |
| | | | 320/108 |
| 2012/0262002 A1 | 10/2012 | Widmer et al. | |
| 2013/0038278 A1* | 2/2013 | Park | H02J 7/00 |
| | | | 320/108 |
| 2014/0266035 A1* | 9/2014 | Cern | H02J 7/025 |
| | | | 320/108 |
| 2015/0364932 A1* | 12/2015 | Tamino | H02J 17/00 |
| | | | 307/104 |
| 2016/0020639 A1* | 1/2016 | Pudipeddi | H02J 7/0042 |
| | | | 320/108 |
| 2016/0052414 A1 | 2/2016 | Bell et al. | |
| 2017/0140603 A1 | 5/2017 | Ricci | |
| 2017/0373522 A1* | 12/2017 | Pelosi | H02J 7/0021 |

* cited by examiner

SYSTEM, APPARATUS, AND METHOD FOR CAPACITIVE WIRELESS CHARGING

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wireless charging can be used by a source device to charge the battery of a user device. For example, a charging station can charge an electric vehicle and a charging pad can charge a portable electronic device wirelessly. In an example, U.S. 2016/0052414 A1 discloses a vehicle charging system that includes a tire pad configured to output signals indicative of a tire location and controls the movement of a transmitter coil based on the output signals.

SUMMARY

Aspects of the disclosure provide a capacitive wireless charging system comprising a charging circuit. The operating characteristics of the charging circuit can be adjusted. An exemplary charging circuit includes two coupling capacitors formed by two transmitter electrode plates of a source device at least partially overlapping two receiver electrode plates of a user device, where the coupling characteristics of the coupling capacitors can be adjusted by moving at least one of the electrodes. When the coupling characteristics of the coupling capacitors reach a pre-determined threshold, the operating characteristics of the charging circuit can be adjusted to optimize the power transfer efficiency of the capacitive wireless charging system. In one embodiment, at least one of the transmitter electrode plates of the coupling capacitors can be configured to rotate around an axis that is geometrically off center and perpendicular to the electrode plate to adjust the coupling characteristics of the coupling capacitors. The charging circuit can include a DC to AC inverter constructed using semiconductor switches. The operating characteristics of the charging circuit can be the switching characteristics of the semiconductor switches, such as the switching frequency, the duty cycle, and the phase angle between the switch legs.

According to an aspect of the disclosure, the capacitive wireless charging system can include a positioning device, configured to move at least one of the transmitter electrode plates, a controller, configured to generate and send control signals to the charging circuit to adjust the operating characteristics of the charging circuit or the positioning device to adjust the coupling characteristics of the coupling capacitors, and a sensing device, configured to detect and send the coupling characteristics of the coupling capacitors to a controller. The positioning device, the controller, and the sensing device can be part of the source device or the user device and can send or receive signals using wired or wireless communication.

Aspects of the disclosure provide a source device. The source device includes a power transmitter configured to transmit power to a user device and to have adjustable operating characteristics. Further, the source device includes two transmitter electrode plates configured to form two coupling capacitors by at least partially overlapping two receiver electrode plates of the user device. In one embodiment, at least one of the transmitter electrode plates is configured to rotate around an axis that is geometrically off center and perpendicular to the transmitter electrode plate to adjust the coupling characteristics of the coupling capacitors. The power transmitter can include a DC to AC inverter constructed using semiconductor switches. The operating characteristics of the power transmitter can be the switching characteristics of the semiconductor switches, such as the switching frequency, the duty cycle, and the phase angle between the switch legs.

Aspects of the disclosure provide a method for a source device to charge a user device. The method includes positioning the user device such that two coupling capacitors are formed between the source device and the user device, detecting and sending the coupling characteristics of the coupling capacitors to a controller, comparing at least one coupling characteristic of the coupling capacitors with a pre-determined threshold, controlling the positioning device to adjust the coupling characteristics of the coupling capacitors or the charging circuit to adjust the operating characteristics according to the coupling characteristics, and charging the user device when the power transfer efficiency is optimized.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
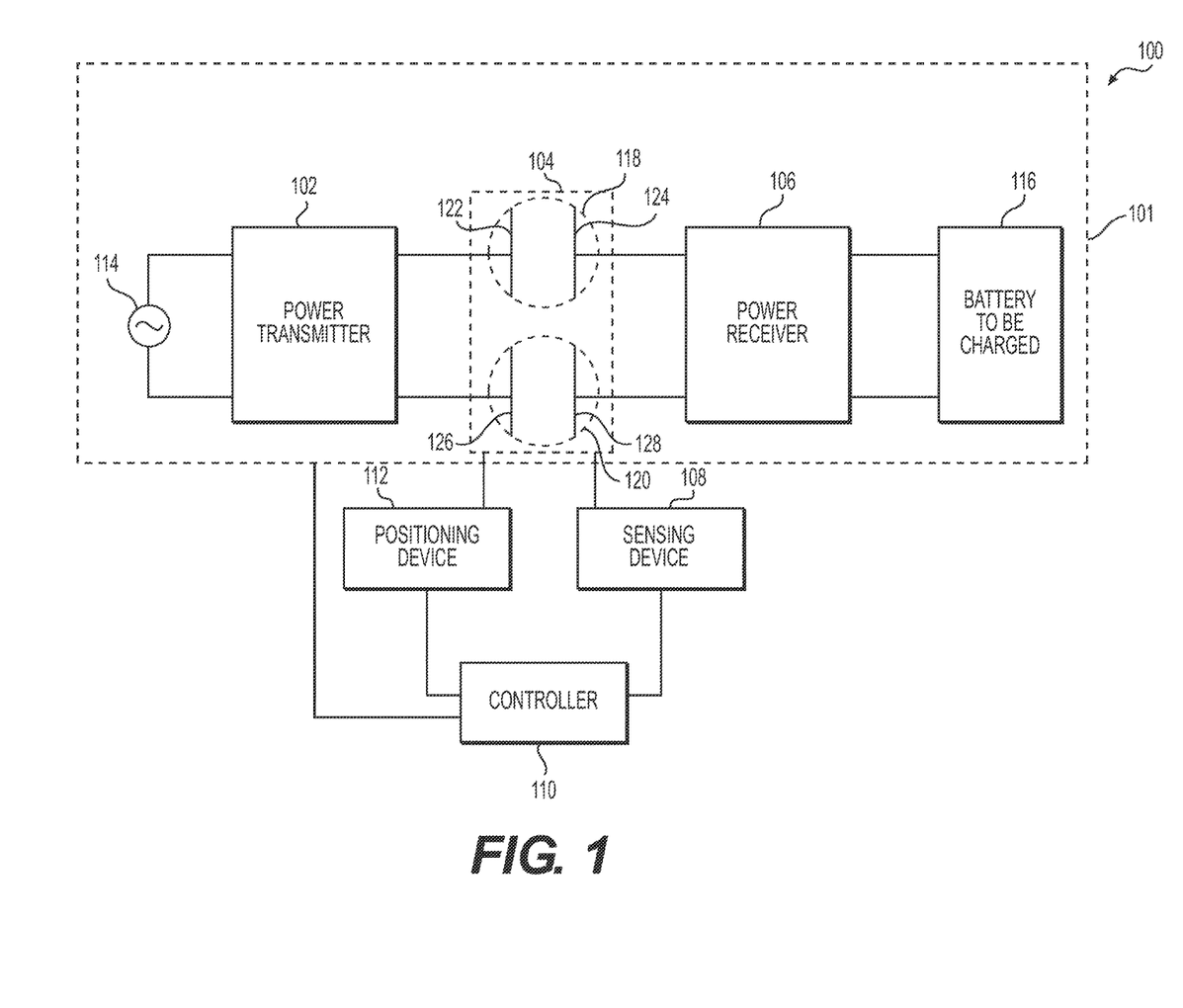
FIG. 1 is a schematics of system 100 according to an embodiment of the disclosure.

FIG. 1 shows the schematics of a system 100 according to an embodiment of the disclosure. The system 100 can be used to transmit power from the source device to charge the battery of a user device via capacitive wireless charging. The system 100 includes a charging circuit 101. The charging circuit 101 includes a power transmitter 102, coupling capacitors 104, and a power receiver 106. The coupling capacitors 104 includes a first coupling capacitor 118 and a second coupling capacitor 120 formed by two transmitter electrode plates 122 and 126 at least partially overlapping two receiver electrode plates 124 and 128, respectively. The system 100 also includes a sensing device 108, a controller 110, and a positioning device 112. The sensing device detects and sends coupling characteristics of the coupling capacitors 104 to the controller 110. Depending on the coupling characteristics, the controller 110 sends control signals to the positioning device 112 to adjust the coupling characteristics of the coupling capacitors 104 or to the charging circuit 101 to adjust the operation characteristics of the charging circuit 101 based on the coupling characteristics. The positioning device 112 can include at least a motor to move at least one of the transmitter or receiver electrode plates and a circuit to control the motor. Further, at least one of the transmitter or receiver electrode plates can be rotated around an axis of the electrode plate which is geometrically off center.

In the charging circuit 101, the coupling capacitors 104 are connected to the power transmitter 102 and the power receiver 106, which are connected to the power source 114 and the battery to be charged 116, respectively. In one embodiment, the charging circuit 101 can charge the battery 116 as follows. An alternating current (AC) voltage is generated by the power transmitter 102 and applied to the transmitter electrodes 122 and 126. The AC voltage induces an AC current flowing between the receiver electrodes (124 and 128) and the power receiver 106. The power receiver 106 converts the AC current into a direct current (DC), charging the battery 116.

The power source 114 supplies the power to the system 100. The voltage can range from nominal 110 to 500 volts (V), and can be single-phase, three-phase, or DC. The current can be tens of amperes (A) to a few hundred amperes. In one embodiment, the power source 114 can be a standard 110V and 16 A household socket.

The power transmitter 102 converts the voltage from the power source 114 into a voltage suitable for the capacitive wireless charging. In one embodiment, semiconductor switches can be used in the power transmitter 102. The operating characteristics of the charging circuit 101 such as the switching frequency, the duty cycle, and the phase angle between the switch legs and the like can be adjusted by controlling the semiconductor switches.

The power receiver 106 converts an AC voltage into a DC voltage that can be used to charge the battery 116. In one embodiment, the power receiver 106 includes an AC to DC rectifier. In another embodiment, the power receiver 106 includes an AC to DC rectifier and a filter.

The coupling capacitors 104 include a first coupling capacitor 118 and a second coupling capacitor 120 connected in series in the charging circuit 101, resulting in a total coupling capacitance $C_{total}$. Each coupling capacitor (118 and 120) includes a transmitter and a receiver electrode plate separated by a dielectric medium such as air or a combination of dielectric media. For example, each electrode of a coupling capacitor (118 and 120) can be coated with a layer of polymer, then the transmitter and receiver electrode plates are separated by air sandwiched between two layers of polymer. Each electrode plate can have a shape suitable for the application, such as circular, rectangular, and the like. At least one of the transmitter or receiver electrode plates can be moved to adjust the coupling characteristics of the coupling capacitors 104 by controlling at least one motor in the positioning device. The movement can be a linear motion along a straight line parallel to the electrode plate, or a rotation around an axis perpendicular to the electrode plate, or a linear motion along an axis perpendicular to the electrode plate, or a combination of the above movements. In one embodiment, at least one of the transmitter electrode plates can be rotated around an axis that is geometrically off center and perpendicular to the electrode plate.

The sensing device 108 detects and sends at least one coupling characteristic of the coupling capacitors 104 to the controller 110. A coupling characteristic of the coupling capacitors 104 can be the total coupling capacitance $C_{total}$. In that case, the sensing device 108 includes circuits to measure the total coupling capacitance $C_{total}$. The coupling characteristics of the coupling capacitors 104 can also include parameters that affect the total coupling capacitance $C_{total}$ of the coupling capacitors 104 such as the first overlapping area of the first coupling capacitor 118 and the second overlapping area of the second coupling capacitor 120. In that case, the sensing device 108 includes position sensors such as cameras, photodiodes, ultrasonic probes, piezo-electric transducers, and the like to determine the relative position of the transmitter electrode plate with respect to the receiver electrode plate of the same coupling capacitor. The sensing device 108 may also include a circuit that can convert the coupling characteristics to appropriate electronic signals and send the electronic signals to the controller 110.

According to aspects of the disclosure, the controller 110 can compare the coupling characteristic[s] with pre-determined threshold[s]. For example, the pre-determined threshold can be a threshold total coupling capacitance $C_{th}$ or a threshold overlapping area of a coupling capacitor, and/or the like. As an example, the threshold total coupling capacitance $C_{th}$ can be on the order of 10 pico-Farads (pF), 1000 pF, and the like. When the coupling characteristic[s] has reached the pre-determined threshold[s], the controller 110 sends control signals to the charging circuit 101 to adjust the operating characteristic[s] of the charging circuit 101 accordingly. Otherwise, the controller 110 sends control signals to the positioning device 112 to adjust the coupling characteristics of the coupling capacitors 104.

The source device includes the power transmitter 102 and the two transmitter electrode plates 122 and 126. The user device includes the two receiver electrode plates 124 and 128, the power receiver 106 and the battery to be charged 116. The sensing device 108, the controller 110, and the positioning device 112 may be included in either the source device or the user device. When implemented in hardware, the charging circuit 101, the controller 110, and the circuits in the sensing and the positioning devices (108 and 112) may comprise one or more discrete components, an integrated circuit, an application-specific integrated circuit (ASIC), etc. Signals can travel between the circuits using appropriate methods such as wired or wireless communication protocol.

The power transfer efficiency of a capacitive wireless charging system is the ratio of the output power to the battery 116 over the input power from the power source 114. The power transfer efficiency is related to both the coupling characteristics of the coupling capacitors 104 and the operating characteristics of the charging circuit 101. The power transfer efficiency can be optimized as follows. First, at least one of the electrodes can be rotated around an axis of the electrode that is geometrically off center so that the coupling characteristics of the coupling capacitors 104 reach the pre-determined threshold. Secondly, the operating characteristics of the charging circuit 101 can be adjusted based on the coupling characteristics of the coupling capacitors 104 to optimize the power transfer efficiency.

Figure 2:
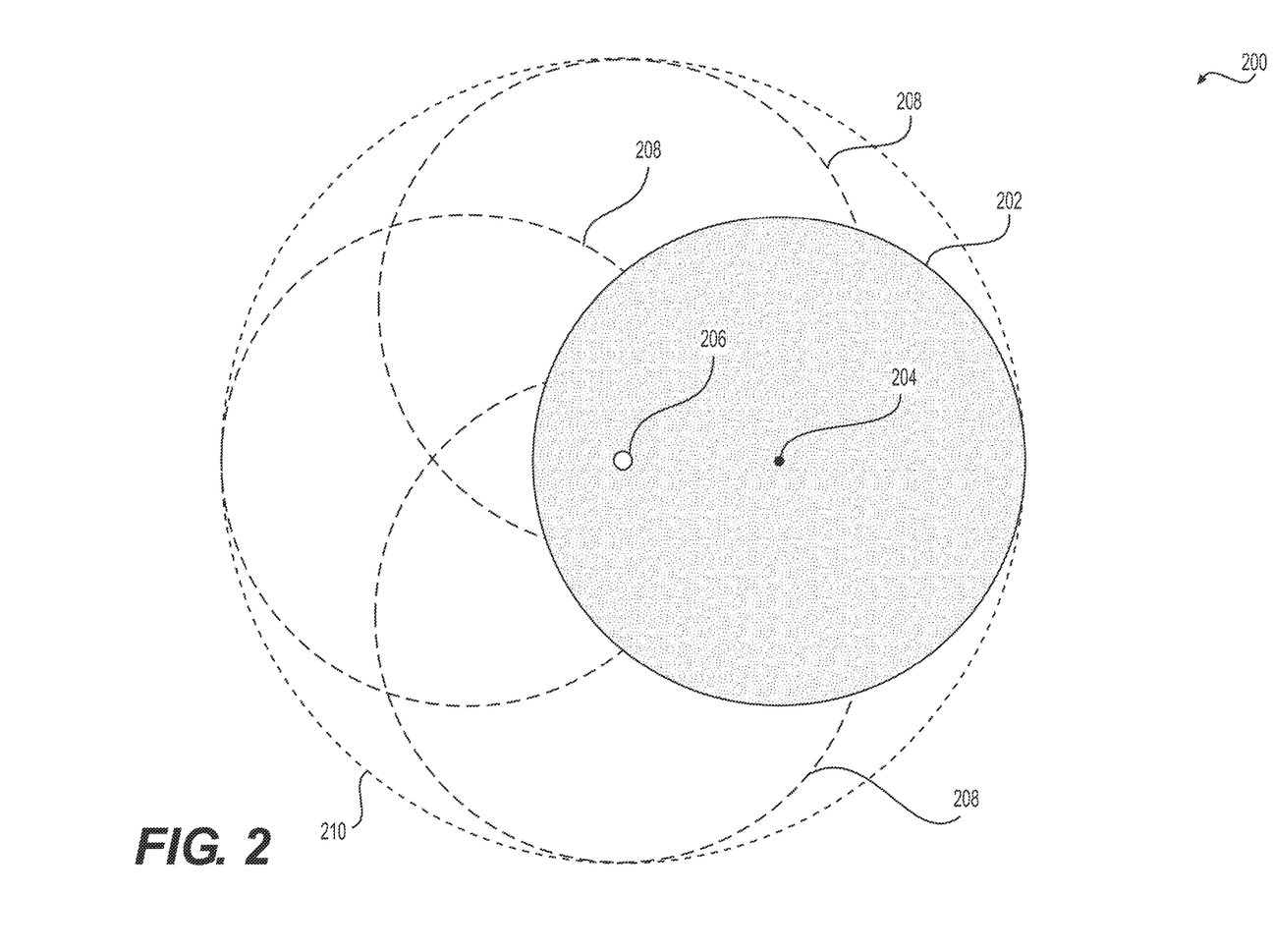
FIG. 2 shows a movement 200 of an electrode plate according to an embodiment of the disclosure.

FIG. 2 shows a movement 200 of an electrode plate according to an embodiment of the disclosure. As discussed earlier, the coupling capacitors 104 includes the first coupling capacitor 118 and the second coupling capacitor 120 formed by two transmitter electrode plates 122 and 126 at least partially overlapping two receiver electrode plates 124 and 128, respectively. At least one of the electrodes can be rotated around an off center axis of the electrode. In one embodiment, a circular electrode plate 202 has the geometric center located at 204 initially. An axis located at 206 is off from the geometric center 204 and is perpendicular to the electrode plate 202. The position of the electrode plate 202 can be adjusted by rotating the electrode plate around the axis 206. Three different positions 208 of the electrode plate are shown as a result of three different rotations. The area covered by the rotation around the axis 206 is indicated by a circle 210. A larger area 210 can be covered by increasing the distance between the axis 206 and the geometric center of the electrode plate 204.

Because the electrode plate 202 is one of the electrode plates of the coupling capacitors 104, the overlapping area of one of the coupling capacitors can be changed by adjusting the position of the electrode plate 202. Thus, the total coupling capacitance $C_{total}$ and the coupling characteristics of the coupling capacitors 104 can be modified.

Figure 3A:
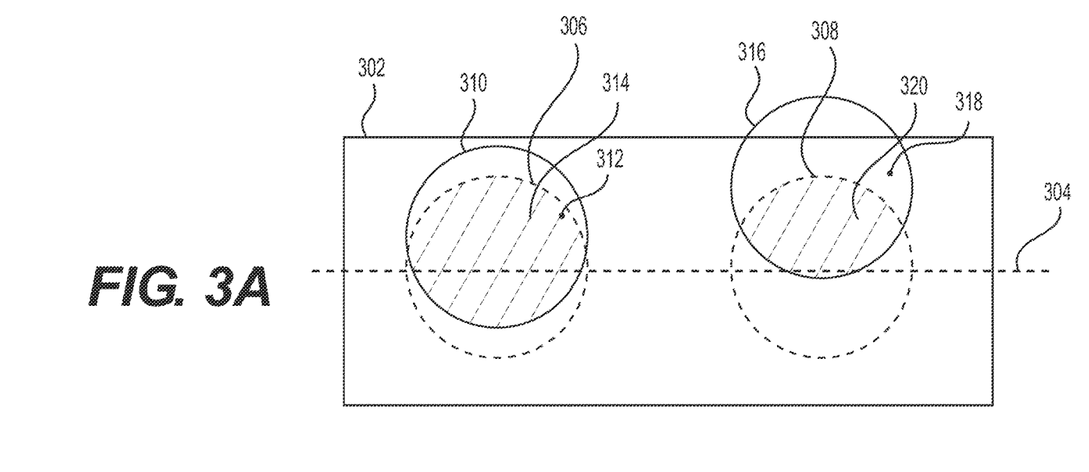
FIGS. 3A-3B show a movement of opposing electrode plates according to an embodiment of the disclosure.
Figure 3B:
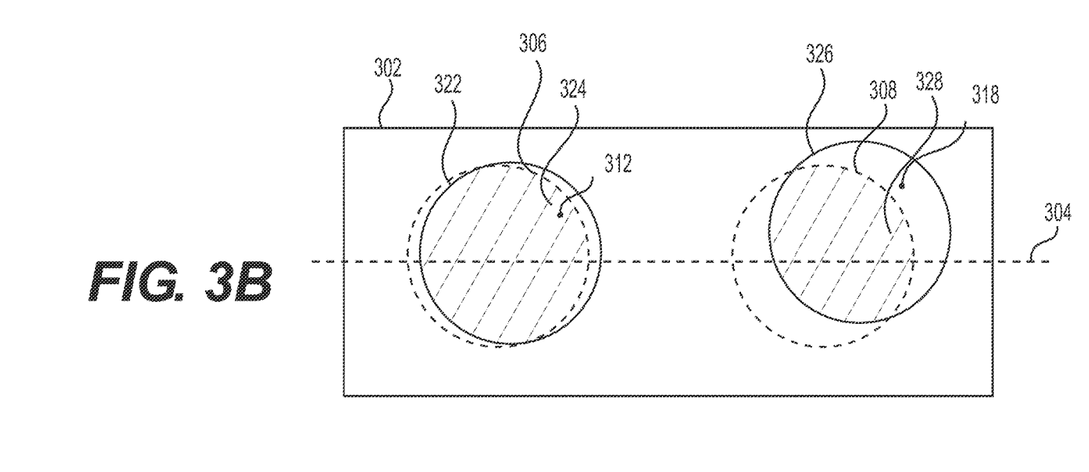

FIGS. 3A-3B show a movement of opposing electrode plates according to an embodiment of the disclosure. In FIG. 3A, the two transmitter electrode plates of a source device are rotatable. Their initial positions are indicated by 310 and 316. Two receiver electrode plates are aligned along an axis 304 of a user device 302. Their positions are indicated by 306 and 308 and do not change. The transmitter and receiver electrodes 310 and 306 overlap partially with an overlapping area 314 and form a first coupling capacitor. The transmitter and receiver electrodes 316 and 308 overlap partially with an overlapping area 320 and form a second coupling capacitor. In this embodiment, the coupling characteristic of the coupling capacitors is the total coupling capacitance $C_{total}$. The initial total coupling capacitance $C_{total\text{-}init}$ may be less than a pre-determined threshold $C_{th}$, i.e., $C_{total\text{-}th}$.

The transmitter electrode plate 310 has a first off-center rotation axis 312 perpendicular to the transmitter electrode plate 310. The transmitter electrode plate 310 can be rotated around the first off-center rotation axis 312 to adjust the first overlapping area 314 of the first coupling capacitor. The transmitter electrode plate 316 has a second off-center rotation axis 318 perpendicular to the transmitter electrode plate 316. The transmitter electrode plate 316 can be rotated around the second off-center rotation axis 318 to adjust the second overlapping area 320 of the second coupling capacitor.

To increase the total coupling capacitance, the overlapping areas 314, or 320, or both overlapping areas need to increase in size. Both areas can be increased by rotating the two transmitter electrode plates around axes 312 and 318, respectively. FIG. 3B illustrates the new positions of the two transmitter electrode plates 322 and 326 after the rotations. The new overlapping areas of the first and second coupling capacitors 324 and 328 are larger than the initial overlapping areas 314 and 320, respectively, and consequently the new total coupling capacitance $C_{total\text{-}new}$ will be larger than the pre-determined threshold $C_{th}$.

In another embodiment (not shown), the two receiver electrode plates of a user device can be configured to be rotated around two different axes which are off center and perpendicular to the respective receiver electrode plates. The two transmitter electrode plates do not move. The coupling characteristics of the coupling capacitors 104 can be adjusted by rotating the two receiver electrode plates respectively.

In addition to rotation, the coupling characteristics of the coupling capacitors 104 can also be adjusted by linear motions. For a capacitor formed by two parallel plates such as the coupling capacitors in FIG. 1 and FIGS. 3A-3B, the capacitance increases with the overlapping area of the capacitor and decreases with the distance between the two parallel plates. Therefore, adjusting the overlapping area of the capacitor and/or the distance between the two parallel plates can change the capacitance and the coupling characteristics of the coupling capacitors. As shown in FIG. 2 and FIGS. 3A-3B, the overlapping area of a capacitor can be adjusted by rotating one of the plates of the capacitor. The overlapping area of a capacitor can also be adjusted by moving one of the plates along a straight line parallel to the plate. Furthermore, the distance between the two parallel plates can be adjusted by moving one of the plates along an axis perpendicular to the plates. In one embodiment, the overlapping area of a capacitor can be increased by moving one of the plates a long a straight line parallel to the plate. The distance between the two parallel plates can be decreased by moving one of the plates closer to the other along an axis perpendicular to the plates. As a result, the capacitance will increase.

Figure 4:
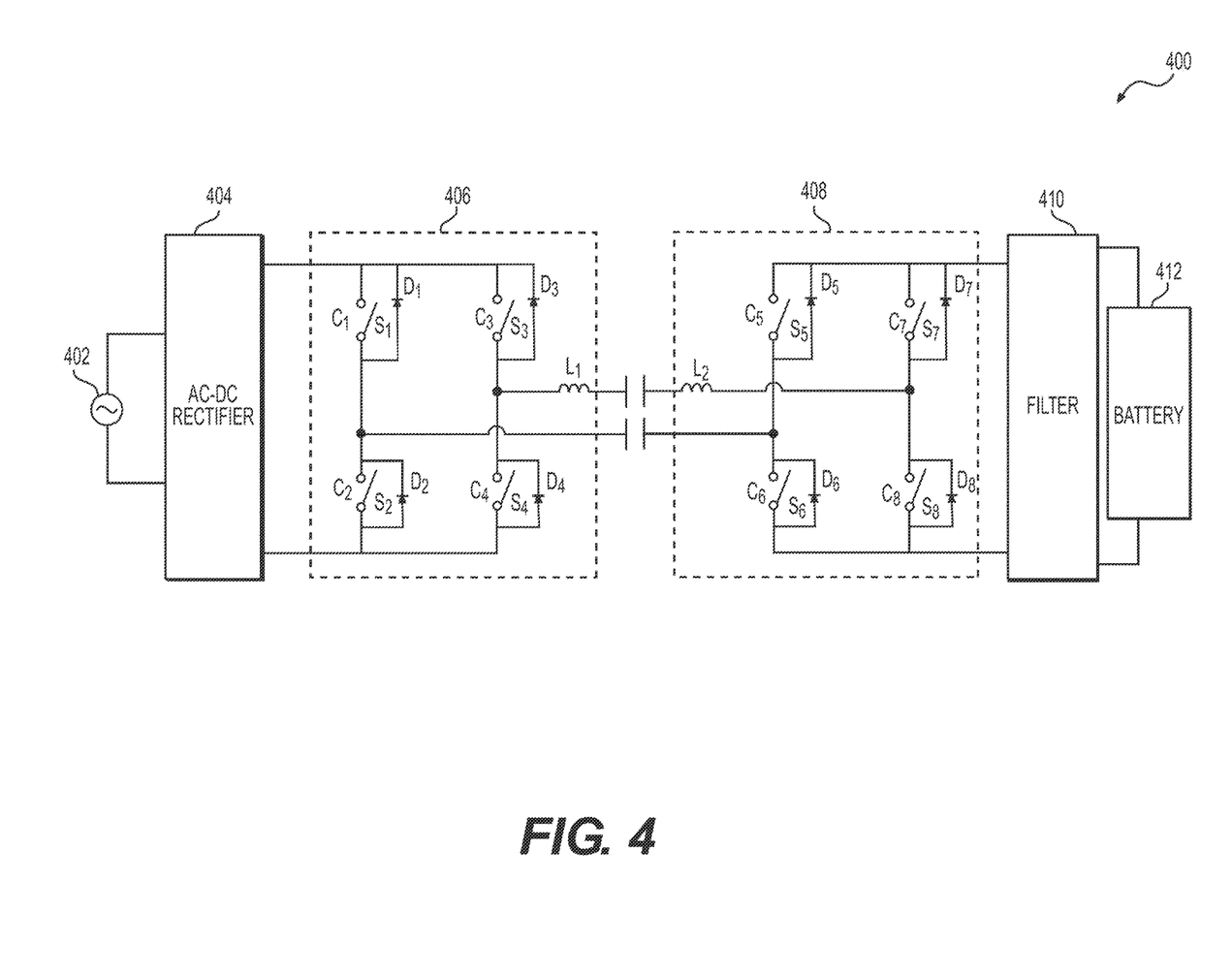
FIG. 4 is a diagram of a charging circuit 400 according to an embodiment of the disclosure.

FIG. 4 illustrates a charging circuit 400 according to an embodiment of the disclosure. The power transmitter is configured to include an AC to DC rectifier 404, a circuit 406, and an inductor $L_1$. The circuit 406 can be a full-bridge switching circuit having four semiconductor switches $S_1$, $S_2$, $S_3$, and $S_4$ and four diodes $D_1$, $D_2$, $D_3$, and $D_4$. The power receiver is configured to include a circuit 408, a filter, and an inductor $L_2$. The circuit 408 can be a full-bridge switching circuit having four semiconductor switches $S_5$, $S_6$, $S_7$, and $S_8$ and four diodes $D_5$, $D_6$, $D_7$, and $D_8$. The power transmitter of the source device transmits power to the power receiver of the user device, charging the battery of the user device. Therefore, the four semiconductor switches $S_1$, $S_7$, $S_3$, and $S_4$ can be switched with a frequency including but not limited to hundreds of kHz and a few MHz while the four semiconductor switches $S_5$, $S_6$, $S_7$, and $S_8$ are kept open or driven as synchronous rectifiers by providing appropriate control signals $C_1$, $C_2$. $C_3$, and $C_4$, $C_5$, $C_6$, $C_7$, and $C_8$. The circuit 406 functions as a DC to AC inverter. The circuit 408 functions as an AC to DC rectifier, followed by a filter 410. The battery 412 can thus be charged.

In some applications, a user device may also be configured to transfer power back to the source device. For example, an electric vehicle can sell the energy in the battery to a grid or a charging station. Therefore, the four semiconductor switches $S_1$, $S_2$, $S_3$, and $S_4$ are kept open or driven as synchronous rectifiers and the four semiconductor switches $S_5$, $S_6$, $S_7$, and $S_8$ can be switched with a frequency including but not limited to hundreds of kHz and a few MHz by providing appropriate control signals $C_1$, $C_2$, $C_3$, $C_4$, $C_5$, $C_6$, $C_7$, and $C_8$. The circuit 408 functions as a DC to AC inverter and the circuit 406 function as an AC to DC rectifier, transferring power from the user device to the source device.

The charging circuit shown in FIG. 4 can be configured to have bidirectional power flow, where the source device can be configured to charge the user device and the user device can be configured to charge the source device. How the power actually flows depends on the operation of the switches $S_1$, $S_2$, $S_3$, $S_4$, $S_5$, $S_6$, $S_7$, and $S_8$ controlled by the control signals $C_1$, $C_2$, $C_3$, $C_4$, $C_5$, $C_6$, $C_7$, and $C_8$. In another embodiment, the charging circuit can be configured to have unidirectional power flow where a source device can charge a user device, but the user device cannot transmit power to the source device. For example, the charging circuit is configured to have unidirectional power flow when the four switches $S_5$, $S_6$, $S_7$, and $S_8$ in FIG. 4 are taken out.

The operating characteristics of the circuits 406 and 408 can be adjusted using control signals $C_1$, $C_2$, $C_3$, and $C_4$ or $C_5$, $C_6$, $C_7$, and $C_8$ to manipulate the semiconductor switches $S_1$, $S_2$, $S_3$, and $S_4$, or $S_5$, $S_6$, $S_7$, and $S_8$, respectively. The control signals $C_1$, $C_2$, $C_3$, and $C_4$ or $C_5$, $C_6$, $C_7$, and $C_8$ are generated by the controller (not shown in FIG. 4) according to the coupling characteristics of the coupling capacitors.

The operating characteristics of the charging circuit such as the switching frequency, the duty cycle, and the phase angle between the switch legs can be adjusted to optimize the power transfer efficiency based on a particular total coupling capacitance $C_{total}$. In one embodiment, the charging circuit can be represented by an inductor-capacitor (LC) circuit with a total equivalent inductance L and a total equivalent capacitance C. The switching frequency $f_s$, which is also the resonant frequency of the charging circuit, can be written as $$f_s = \frac{1}{2\pi\sqrt{LC}}.$$

When all other capacitive effects in the charging circuit are insignificant compared to the total coupling capacitance $C_{total}$, C can be approximated by $C_{total}$. The switching frequency can be written as $$f_s = \frac{1}{2\pi\sqrt{LC_{total}}}.$$

When the overlapping areas of the coupling capacitors decrease, the total coupling capacitance $C_{total}$ decreases, requiring a higher switching frequency.

The relationship between the operating characteristics of the charging circuit and the coupling characteristics of the coupling capacitors can affect the threshold coupling characteristics. For example, when the switching frequency is related to the total coupling capacitance of the charging circuit as $$f_s = \frac{1}{2\pi\sqrt{LC_{total}}},$$

the total coupling capacitance can be written as $$C_{total} = \frac{1}{L(2\pi f_s)^2}.$$

Switching frequencies such as hundreds of kHz can be used in capacitive wireless charging, however, an excess high switching frequency can lead to electromagnetic interference (EMI) and a lower power transfer efficiency. Therefore, a maximum switching frequency $f_{s,max}$ can be set to avoid excessive EMI and a lower power transfer efficiency. The maximum switching frequency $f_{s,max}$ corresponds to a minimum total coupling capacitance, i.e., the threshold total coupling capacitance $C_{th}$. For example, if the maximum switching frequency is set to 2 MHz and L=14.325 micro-Henry (mH) in the charging circuit, the threshold total coupling capacitance $C_{th}$ is =442.5 pF. To achieve $C_{th}$ of 442.5 pF, two identical coupling capacitors of 885 pF each can be connected in series, as shown in FIGS. 1 and 4. Each coupling capacitor can be realized by two parallel electrode plates with an overlapping area of one meter squared and separated by air with a distance of 10 centimeters (cm). The distance between the two parallel electrode plates can be on the order of 0.1 cm or over 10 cm, and the like.

Different circuit designs can be used to implement a DC to AC inverter. In one embodiment, a half-bridge circuit may be used. A semiconductor switch can be implemented using silicon metal-oxide-semiconductor field effect transistor (Si MOSFET), insulated-gate bipolar transistor (IGBT), thyristors, and the like. The DC to AC inverter can be implemented using silicon, gallium nitride, silicon carbide, gallium arsenide, and the like.

Figure 5:
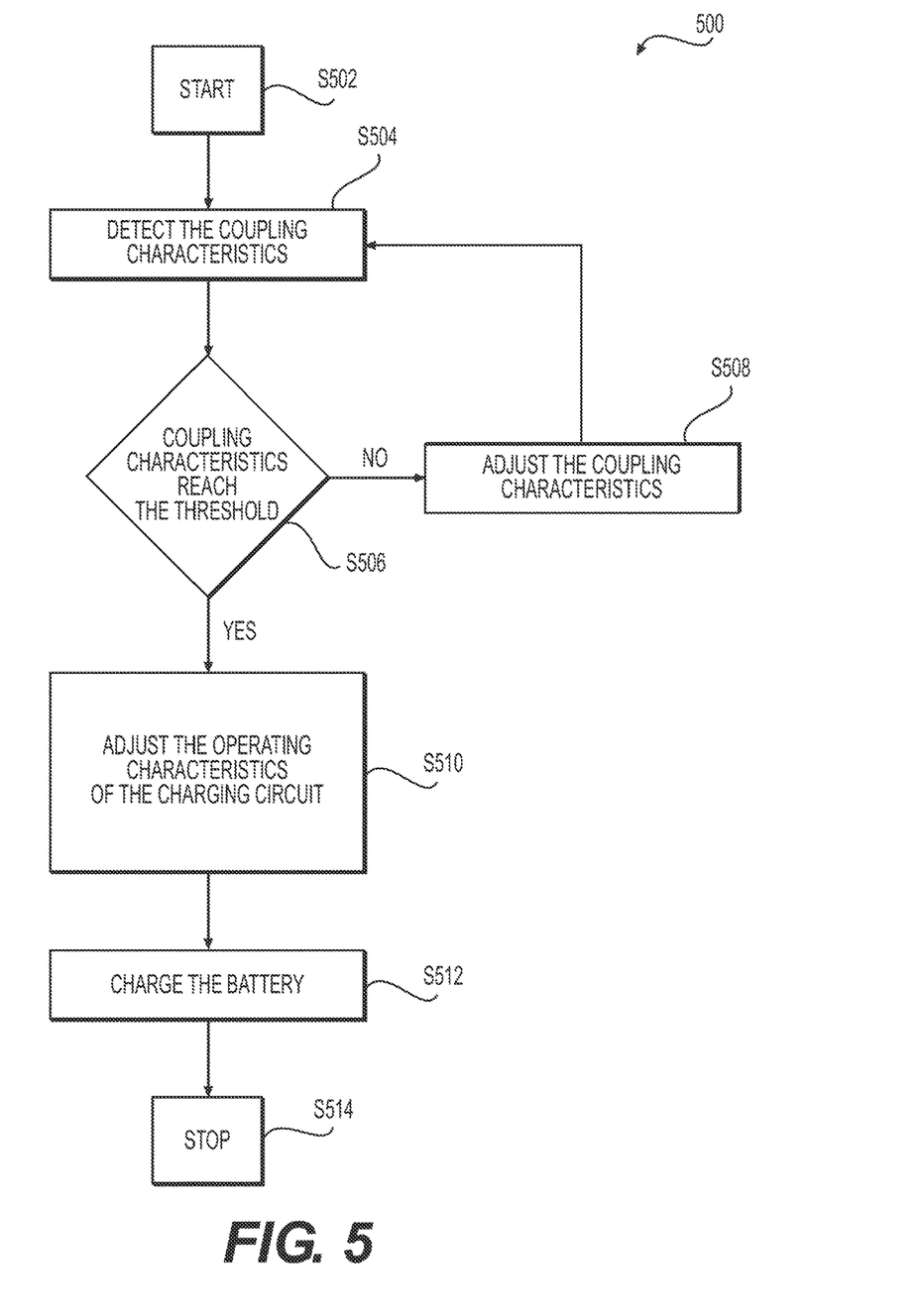
FIG. 5 is a flow chart outlining a method 500 according to an aspect of the disclosure.

FIG. 5 is a flow chart outlining a method 500 according to an aspect of the disclosure. In an example, the method 500 is executed to charge the battery of a user device by a source device via capacitive wireless charging. For example, the method 500 can be used by a charging station to charge an electric vehicle or by a charging pad to charge a portable electronic device.

The method starts at S502. At S502, the user device is located such that the two transmitter electrode plates 122 and 126 at least partially overlap two receiver electrode plates 124 and 128, respectively. Markers can be put on and round the source device so that the user device is confined within respective markers. For example, an electric vehicle is parked in a designated space.

At S504, the sensing device 108 detects the coupling characteristics of the coupling capacitors 104. For example, the coupling characteristics can be the total coupling capacitance $C_{total}$ of the coupling capacitors 104. In one exemplary embodiment, the sensing device injects a current into the charging circuit 101 and measures the total capacitance $C_{charge}$ of the charging circuit 101. The total capacitance of the charging circuit 101 includes $C_{total}$ and the sum of all the other capacitances $C_{other}$ in the charging circuit 101. The total coupling capacitance $C_{total}$ can be calculated using $C_{charge}$ and $C_{other}$. Next, the sensing device 108 sends the coupling characteristics to the controller 110.

At S506, the controller 110 compares the coupling characteristics with the pre-determined threshold. For example, the pre-determined threshold can be a threshold total coupling capacitance $C_{th}$. If the current coupling characteristics do not reach the threshold, i.e. $C_{total} < C_{th}$, the controller 110 sends control signals to the positioning device 112 which adjusts the coupling characteristics of the coupling capacitors 104 at S508. If the current coupling characteristics reach the threshold, i.e. $C_{total} \geq C_{th}$, the controller 110 sends control signals to the charging circuit 101 to adjust the operating characteristics of the charging circuit 101 at S510.

At S508, the positioning device 112 adjusts the coupling characteristics of the coupling capacitors 104. If the coupling characteristics do not reach the threshold, i.e. $C_{total} < C_{th}$, the two transmitter electrode plates can be rotated around the respective off-center rotation axes to adjust the two overlapping areas of the two coupling capacitors, respectively, as shown in FIGS. 3A-3B. $C_{total}$ can be adjusted and measured iteratively using S504, S506, and S508 until $C_{total} \geq C_{th}$.

When $C_{total} \geq C_{th}$, the controller 110 sends control signals to the charging circuit 101 to adjust the operating characteristics of the charging circuit 101 at S510. In one embodiment, the controller 110 generates four control signals $C_1$, $C_2$, $C_3$, and $C_4$ and sends them to control the switching frequency of the semiconductor switches $S_1$, $S_2$, $S_3$, and $S_4$ and another four signals $C_5$, $C_6$, $C_7$, and $C_8$ to keep the semiconductor switches $S_5$, $S_6$, $S_7$, and $S_8$ in the open state in FIG. 4. The switching frequency can be increased to optimize the power transfer efficiency.

When the power transfer efficiency is optimized, the charging process is configured to start at S512. At S514, the charging process is finished.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A capacitive wireless charging system, comprising:
   a charging circuit having adjustable operating characteristics, and including two coupling capacitors formed by two transmitter electrode plates of a source device at least partially overlapping two receiver electrode plates of a user device; and
   a positioning device configured to move at least one of the transmitter electrode plates in order to adjust coupling characteristics of the coupling capacitors to reach a pre-determined threshold wherein the at least one transmitter electrode plate is configured to rotate around an axis that is geometrically off center of the at least one transmitter electrode plate and the coupling characteristics indicate a total coupling capacitance of the coupling capacitors.

2. The capacitive wireless charging system of claim 1, wherein the charging circuit further includes a DC to AC inverter constructed using semiconductor switches.

3. The capacitive wireless charging system of claim 2, wherein the adjustable operating characteristics of the charging circuit are determined by switching characteristics of the semiconductor switches.

4. The capacitive wireless charging system of claim 1, further comprising:
   a controller configured to adjust the operating characteristics of the charging circuit and to control the positioning device to move the at least one transmitter electrode plate in order to adjust the coupling characteristics of the coupling capacitors to reach the pre-determined threshold; and
   a sensing device configured to detect and send the coupling characteristics of the coupling capacitors to the controller,
   wherein the positioning device, the controller, and the sensing device are part of the source device or the user device and are configured to send or receive signals using wired or wireless communication.

5. The capacitive wireless charging system of claim 4, wherein at least one electrode plate of the transmitter electrode plates and the receiver electrode plates is configured to move along an axis perpendicular to the at least one electrode plate.

6. The capacitive wireless charging system of claim 4, wherein the positioning device includes at least a motor to move the at least one transmitter electrode plate.

7. The capacitive wireless charging system of claim 4, wherein the charging circuit is configured to have a bidirectional power flow, the source device is configured to charge the user device, the user device is configured to transmit power to the source device, and a direction of the bidirectional power flow is controlled by control signals from the controller.

8. The capacitive wireless charging system of claim 4, wherein the charging circuit is configured such that the source device charges the user device and the user device does not transmit power to the source device.

9. The capacitive wireless charging system of claim 4, wherein each transmitter electrode plate is configured to rotate around an axis that is geometrically off center of the respective transmitter electrode plate.

10. The capacitive wireless charging system of claim 9, wherein the charging circuit further includes a DC to AC inverter constructed using semiconductor switches and the adjustable operating characteristic of the charging circuit are determined by switching characteristics of the semiconductor switches.

11. The capacitive wireless charging system of claim 4, wherein
   when the coupling characteristics indicates that the total coupling capacitance of the coupling capacitors or an overlapping area of one of the coupling capacitors is less than the pre-determined threshold, the controller controls the positioning device to move the at least one transmitter electrode plate in order to adjust the coupling characteristics to reach the pre-determined threshold; and
   when the coupling characteristics reaches the pre-determined threshold, the controller adjusts the operating characteristics of the charging circuit.

12. A source device, comprising:
   a power transmitter configured to transmit power to a user device and to have adjustable operating characteristics;
   two transmitter electrode plates configured to form two coupling capacitors by at least partially overlapping with two receiver electrode plates of the user device; and
   a positioning device configured to move at least one of the transmitter electrode plates in order to adjust coupling characteristics of the coupling capacitors to reach a pre-determined threshold;
   wherein the at least one transmitter electrode plate is configured to rotate around an axis that is geometrically off center of the at least one transmitter electrode plate and the coupling characteristics indicate a total coupling capacitance of the coupling capacitors.

13. The apparatus of claim 12, further comprising:
   a controller configured to adjust the operating characteristics of the power transmitter and to control the positioning device to move the at least one transmitter electrode plate in order to adjust the coupling characteristics of the coupling capacitors; and
   a sensing device configured to detect and send the coupling characteristics of the coupling capacitors to the controller,
   wherein the positioning device, the controller, and the sensing device are located on the source device.

14. The apparatus of claim 13, wherein the power transmitter includes a DC to AC inverter constructed using semiconductor switches.

15. The apparatus of claim 14, wherein the adjustable operating characteristic of the power transmitter is determined by switching characteristics of the semiconductor switches.

16. The apparatus of claim 13, wherein the at least one transmitter electrode plate is configured to move along an axis perpendicular to the at least one transmitter electrode plate.

17. A method of charging a battery of a user device by a source device, comprising:
   positioning the user device such that two transmitter electrode plates at least partially overlap two receiver electrode plates forming coupling capacitors;
   detecting, by a sensing device, coupling characteristics of the coupling capacitors;
   comparing, by a controller, at least one coupling characteristic of the coupling capacitors with a pre-determined threshold;
   controlling a positioning device to adjust the at least one coupling characteristic of the coupling capacitors when the at least one coupling characteristic does not reach the pre-determined threshold;

controlling a charging circuit to adjust operating characteristics of the charging circuit when the at least one coupling characteristic has reached the pre-determined threshold; and charging the battery when power transfer efficiency is optimized by adjusting the operating characteristics of the charging circuit, the sensing device, the controller, and the positioning device provided in one of the source device and the user device.

18. The method of claim 17, wherein controlling the positioning device includes rotating at least one of the transmitter electrode plates around a geometrically off center axis of the at least one transmitter electrode plate.

19. The method of claim 18, wherein controlling the positioning device includes moving at least one of the transmitter electrode plates along an axis perpendicular to the at least one of transmitter electrode plates.

20. The method of claim 18, wherein the charging circuit includes a DC to AC inverter constructed using semiconductor switches and adjusting the operating characteristics of the charging circuit includes controlling switching characteristics of the semiconductor switches.

* * * * *